United States Patent [19]

Pickett et al.

[11] 4,123,133
[45] Oct. 31, 1978

[54] METHOD AND APPARATUS FOR APPLYING A CONNECTOR TO ELECTRICAL CONDUCTOR STRANDS

[76] Inventors: Wiley J. Pickett, 620 N. Washington Ave., Moorestown, N.J. 08057; Albert A. Boye, 608 College Blvd., Wenonah, N.J. 08090

[21] Appl. No.: 803,548

[22] Filed: Jun. 6, 1977

[51] Int. Cl.² ............................................. H01R 11/08
[52] U.S. Cl. .................................. 339/273 R; 403/275
[58] Field of Search ............................ 339/273, 276 D; 403/216, 275, 281; 174/79

[56] References Cited

U.S. PATENT DOCUMENTS

| Re. 20,074 | 8/1936 | Stahl | 339/273 R |
| 1,258,304 | 3/1918 | Bishop | 339/273 R |
| 3,600,765 | 8/1971 | Rovinsky | 403/275 |

FOREIGN PATENT DOCUMENTS

| 2,307,192 | 11/1976 | France | 403/275 |
| 1,441,929 | 7/1976 | United Kingdom | 403/216 |

Primary Examiner—Joseph H. McGlynn
Attorney, Agent, or Firm—Howson and Howson

[57] ABSTRACT

A connector for making connection to an end of an electrical conductor cable to be pulled through conduits or the like comprises a centrally-bored inner connector member having a conical outer surface wedged into a correspondingly conical recess in an outer connector member, with an outer portion of the end of the conductor cable grasped between the two conical surfaces and an inner portion of the cable end gripped within the central bore of the inner connector member. The inner conical member is made of a material which is highly malleable with respect to the inner surface of the outer connector member and at least as malleable as the material of the cable, and sufficient wedging force is provided between the inner and outer connector members so that both the inner and outer portions of the conductor cable become embedded to a substantial extent in the material of the inner connector member. This embedding enhances the strength with which the inner and outer connector members grasp the inner and outer cable portions. The wedging action may be provided by the normal forces used to pull the cable. A preferred material for the inner connector member is aluminum of a purity of at least 80% and preferably greater than 95%, with an elongation of at least 20% and preferably greater than 30%, and a Brinell hardness number no greater than 40 and preferably less than 25.

23 Claims, 3 Drawing Figures

U.S. Patent    Oct. 31, 1978    4,123,133
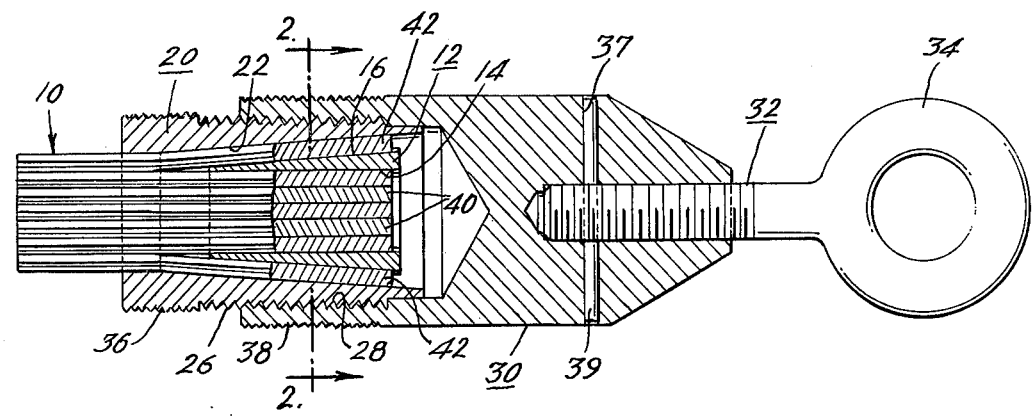
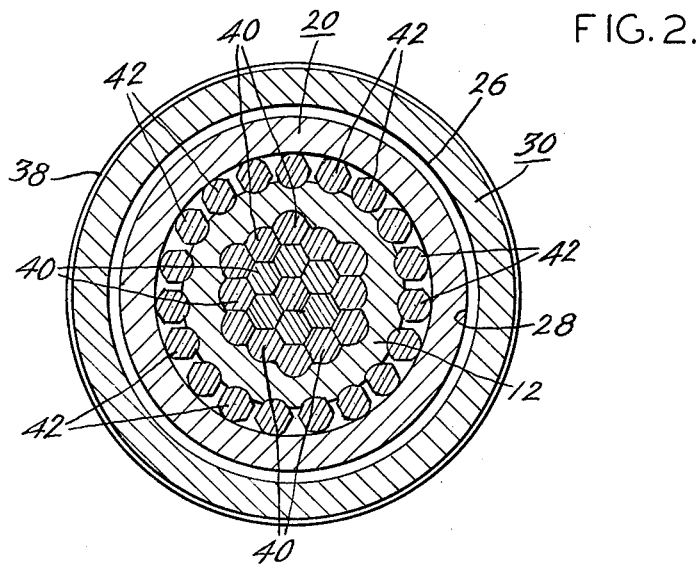
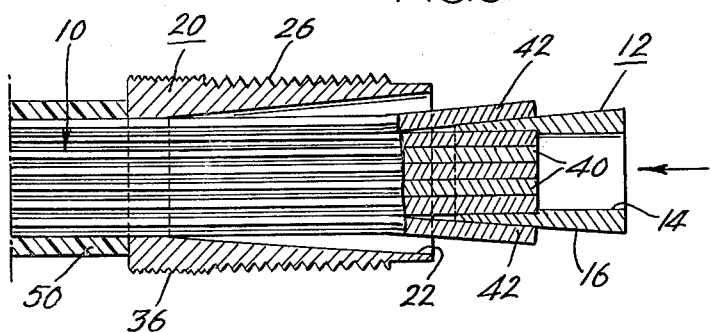

METHOD AND APPARATUS FOR APPLYING A CONNECTOR TO ELECTRICAL CONDUCTOR STRANDS

BACKGROUND OF THE INVENTION

Connectors of various types are known, and have been used, to grasp the ends of electrical conductors so they can be pulled through narrow passageways or conduits into the desired installation position. These conductors may typically have a diameter of between ¼ and 3 ¼ inches, and may comprise the strands of a multi-strand cable, or mutually insulated strands of a multi-conductor cable, or entirely separate individually insulated wires or strands.

In many cases the connection must withstand severe pulling forces, for example as much as about 50,000 lbs. in some cases. Yet the connector should usually be as small as possible so it will be able to negotiate rather sharp bends in the conduit, for example the minimum 90° elbow radii permitted by the National Electrical Code. Since the connector is usually applied in the field, when and as required by the particular installation, it should be as simple as possible to assemble, without requiring special or expensive tools or equipment. The connector parts themselves should be as inexpensive as possible, and reusability of at least some of the connector parts will contribute to reducing the expense of repeated cablepulling operations. It is also desirable in some cases to waterproof the devices by heat-shrinking a sleeve over it, particularly when the conductors are to be pulled through conduits contaminated with water, oil or mud.

Among the types of methods and apparatus for making such connections are swaged-type connectors such as disclosed in U.S. Pat. No. 3,673,313 of Wiley J. Pickett and Bynum E. Smith, filed Apr. 23, 1970 and issued June 27, 1972. While suitable for many purposes, the latter connector does require the presence on site of special high-pressure swaging equipment, and it is not generally feasible to re-use the connector parts.

Various other connectors are also known for making connections to the end of a cable, support wire, rope or the like using a wedge principal. Specifically in the art of boat rigging, it is known to use a steel connector made up of a split longitudinally-bored steel inner connector member having a conical outer surface, and a steel outer connector member having an inner longitudinal aperture the surfaces of which are conical with about the same taper as the exterior of the inner connector member. An outer layer of strands of a steel wire cable is disposed between the exterior conical surface of the inner conductor member and the inner conical surface of the outer connector member; the central strand is inserted into the central bore of the inner connector member. The inner connector member is then forced into the outer connector member by a screw-fitted cap, so that the outer strand layer is wedged between the conical surfaces of the inner and outer connector members, and the split inner connector is closed around the central strand. Also, at least some of the outer strands are additionally clamped between the cap and the inner connector member.

So far as is known to applicants, the latter boat-rigging technology has not been successfully transferred to the art of pulling electrical conductors. However, experiments performed by applicants have shown that if one attempts to apply this construction to the pulling of electrical conductors, (which are usually copper or aluminum, and therefore more soft and malleable than steel) there is a tendency under strong pulls for the conductors to be extruded and flattened between the hard steel surfaces on each side of them and to break more readily than desired.

BRIEF SUMMARY OF THE INVENTION

To accomplish the purposes of the present invention, a longitudinally-apertured inner connector member having a generally conical outer surface is positioned within an outer connector member having a conical inner surface generally parallel to the outer conical surface of the inner connector member; at least one strand of conductor is disposed between the outer surface of the inner connector member and the inner surface of the outer connector member, and at least another conductor strand is placed within the longitudinal aperture in the inner connector member. The inner connector member is then forced into the outer connector member, as may be accomplished by exerting a pull on the outer connector member. Importantly, according to the invention the inner connector member is made of a material which is highly malleable compared with the inner surface of the outer connector member, and at least about as malleable (and preferably more malleable) than the conductor material. The forcing of the inner connector member into the outer connector member is sufficient to embed the outer strand or strands in the outer surface of the inner connector member, and to embed the inner strand or strands in the inner surface of the inner connector member. The malleable nature of the inner connector member therefore not only permits the desired transfer of the wedging forces to the inner cable portion inside the inner connector member, but also provides an embedding action which strengthens the resistance of the connector to pulling off from the cable when high pulling forces are applied. By thus embedding the strands in the inner connector member, the extruding or flattening effect on the strands is reduced, thus improving the tensile capability of the assembly.

The procedure for assemblying the connector parts on the cable is very simple, and requires no specialized equipment. The forces required to produce the wedging action can be provided merely by the application of pulling forces to the strands during the normal pulling operation. By disassembly of the connectors after use, all parts can be reused except for the malleable inner-connector member. The connector lends itself to small sizes, permitting pulling through sharp bends, and to being easily waterproofed.

It is preferred to use an inner connector material having an elongation of at least 20% and preferably greater than 30%, and a Brinell hardness number of less than 40 and preferably less than 25. The preferred material is aluminum of at least 80% purity and preferably more than 95%.

BRIEF DESCRIPTION OF FIGURES

These and other objects and features of the invention will be more readily understood from a consideration of the following description, taken with the accompanying drawings, in which:

FIG. 1 is a vertical sectional view through an assembly of pulling connector and electrical conductor cables, in accordance with the invention in one of its forms;

FIG. 2 is a cross-sectional view taken along lines 2—2 of FIG. 1; and

FIG. 3 is a vertical sectional view of the connector-and-cable arrangement of FIG. 1 as it appears during the process of assembling it, with the leading fitting removed and before pulling forces have been applied.

DETAILED DESCRIPTION OF SPECIFIC EMBODIMENTS

Considering now the embodiments of the invention illustrated in the Figures by way of example only, there is shown a stranded electrical conductor cable 10, in this example made up of four adjacent layers of 37 copper strands of originally circular cross-section, from which any insulation or sheathing has been removed. Secured to it is a connector comprising an inner connector member 12 having a longitudinal cylindrical inner aperture 14 extending through it, and having an outer conical surface 16. Inner connector member 12 is positioned within outer connector member 20, which has an inner longitudinal conical surface 22 extending generally parallel to conical surface 16 of the inner connector member 12. Outer connector member 20 is provided with external threads 26, threadingly engaged with internal threads 28 of an additional connector member 30 which serves as a lead fitting. An eye member 32 is screwed into lead fitting 30, the eye 34 which is adapted to be connected to a source of pulling force for pulling the cable 10 through a conduit or the like. Outer connector member 20 may be provided with appropriate external knurling as shown at 36, and lead fitting 30 may be provided with knurling 38, both to facilitate manual screwing together of parts 20 and 30. A bore 37 extends transversely through lead fitting 30 an eye member 32, and a pin 39 is pressed into bore 37 to hold the eye member against rotation during pulling.

Within the connector assembly, the inner portion of cable 10 comprising strands such as 40, extends into the cylindrical opening 14 in inner connector member 12, while the outer row of cable strands, such as 42, extends between the outer conical surface 16 of inner connector 12 and the inner conical surface 22 of outer connector member 20. The strands are shown as they may appear after substantial pulling force has been applied to eye member 32 against the resistance of cable 10, whereby inner connector 12 is in fact wedged into the inner conical surface 22 of the outer connector 20; as a result, a strong squeezing or compressing force is exerted between conical surface 22 and conical surface 16 which drives the outer strands radially inward into inner connector member 12, so as to become embedded in the surface thereof, while at the same time sufficient compression force is transmitted through the inner connector member 12 to produce a similar compressive force on the inner strands such as 40, causing them to become embedded in the inner surface of the inner connector member.

This embedding and transmission of forces to the inner strands is made possible by the highly malleable nature of the material of the inner conductor member 12, which absorbs some of the compressive force which otherwise would tend to flatten or extrude the outer strands especially, and predispose them toward breaking, and enhances the grasping action of the connector on the strands. The highly malleable inner connector member 12, in this process, is itself extruded somewhat, as shown by the fact that its length in this example is of the order of 10% longer than its length prior to the application of the strong pulling forces producing the wedging action and compressive forces.

It has been found that an assembly like that shown in FIGS. 1 and 2 not only resists the recommended maximum pulling forces for pulling conductors of various sizes and materials, but provides in fact a very large margin of safety, permitting the exceeding of recommended pulling forces by a wide margin when necessary, for example to overcome fouling or impeding of the connector as it is being pulled through the conduit or other passageway.

Referring to FIG. 3, in which parts corresponding to those of FIGS. 1 and 2 are indicated by corresponding numerals, the stripped end of the cable 10 is pushed through the outer connector member, or trailing fitting 20, in the direction from its smaller inner-diameter end to its larger inner-diameter end, until it assumes the relative longitudinal position illustrated in FIG. 3. In this example wherein it is assumed that the cable is 500 mcm stranded copper cable, the position shown on FIG. 3 may be assured by stripping the exterior insulation 50 from the end of the cable to a distance of 3 inches and advancing the bared end of the cable into the outer connector member 20 until the insulation 50 abuts the end of connector 20 as shown.

The smaller end of the inner connector member 12 is then positioned in alignment with the inner strands 40 and pressed into the cable with a twisting motion in the direction of the cable lay, so as to insert the cone partially between the inner strands 40 and the outer strands 42 as shown in FIG. 3. To insert inner connector 12 fully, it may be tapped lightly with a hammer until its outer end is flush with the ends of the conductor strands. Next the additional connector member or leading fitting 30 may be screwed on to the exterior of outer connector 20 and the pin 39 press fitted into bore 37. Standard pulling forces may then be applied to the eye 54 to pull it through a conduit or other passageway, which will further seat the strands in the wedged position and partially embed them in the malleable material of the inner connector member. If extremely high pulling forces are required, this will further embed the strands in the inner and outer surfaces of the inner connector member, relieving or taking up the tendency for the strands to be extruded, flattened and weakened, and providing a high grasping force on the strands to resist pull-out during such excessively high pulling forces.

If desired, a heat-shrinkable sleeve can be placed over the connector, extending for example from near the forward end of the leading fitting 30 to a point on the insulation of cable 10, and heat shrunk into position prior to the pulling operation, thereby to protect the connector assembly, and especially the interior of the cable, from intrusion of moisture during the pulling operation.

By way of example only, where the cable is a 500 mcm copper cable comprised of 37-strand, round, class B stranding, the outer connector member 20 may be 2 inches long with a cylindrical interior surface of about 13/16 inch diameter extending for ¼ inch inward from its left hand side and then diverging in conical form, with a 5° taper, to its right-hand extreme; the outer connector member may be made or stainless steel. The inner connector member may initially be 1 ⅛ inches in length, with a ⅞ inch maximum outer diameter and a 5° taper on its outer conical surfaces.

There are many variations of the invention which may find use in various applications, the following of which are mentioned without in any way indicating that others may not be used.

As to materials for the inner connector member or cone 12, aluminum is preferred, but in some cases other materials having the requisite strength and malleability may be used, such as lead or its alloys or mixtures. The tapers of the inner and outer conical surfaces may be varied somewhat from 5°, and these tapers may also differ somewhat from each other. In some cases the leading fitting may be configured to bear against the larger end of the inner connector member or cone 12, as it is screwed on during assembly, to provide an initial wedging action, but this is not necessary. The pulling device used to connect to the leading fitting may take other forms, and may for example include an appropriate swivel, or a pulling plate for pulling more than one leading fitting at a time. The conductors can be of any of the usual types, including copper or aluminum, of various sizes, strand shapes and lays.

Additionally, the connector is not limited to use in connecting to the mutually-uninsulated strands of the same cable, but may be used to connect to mutually-insulated strands from different cables or to any combination of strands from different sources; for example, the invention may be used with a multi-conductor cable containing a plurality of mutually-insulated conductors. In such cases, enough strands are preferably selected to fill the inner cylindrical aperture in the inner connector member, and to substantially fill the space between inner and outer connector members at the smaller end of the conical surfaces when the connector members are in their wedged condition. Preferably about one-half the strand material is inside the inner connector member and about half is between the conical surfaces.

Thus while the invention has been described with particular reference to specific embodiments in the interest of complete definiteness, it may be embodied in a variety of forms diverse from those specifically shown and described, without departing from the spirit and scope of the invention.

What is claimed is:

1. In cable connector apparatus for enabling the grasping and longitudinal pulling of electrical conductor strands of copper or aluminum, comprising
    an outer connector member having a longitudinal aperture extending therethrough providing a conical inner surface for at least a substantial portion of the length of said aperture;
    a longitudinally apertured inner connector member positioned within said outer connector member and having a continuous and uninterrupted conical outer surface extending parallel to said conical inner surface of said outer connector member for receiving some of said electrical conductor strands within its longitudinal aperture, and for receiving others of of said electrical conductor strands between said conical outer surface thereof and said conical inner surface of said outer connector member, the outer diameters of said inner connector member being sufficient that when said outer connector member is urged longitudinally toward the larger end of said inner connector member said other strands are wedged and grasped between said outer conical surface of said inner connector member and said inner conical surface of said outer connector member;
    the improvement wherein said inner connector member is of a material which is highly malleable compared with said inner surface of said outer connector member and at least as malleable as the material of said cable, whereby said strands become embedded in both the inner and outer surfaces of said highly malleable material of said inner connector member when said wedging occurs, thereby to enhance the strength of said grasping of said strands without breaking them; said inner connector member being sufficiently hard to transmit compressive forces, due to said wedging, to said other conductors and thereby produce said embedding thereof; the outer diameter of said inner connector member being sufficient, over at least a portion of its length, to leave a substantial remanent thickness of said material between said some strands and said other strands upon application of said pulling; said remanent thickness being great enough that the maximum diameter formed by said other strands is greater, upon application of said pulling, than the diameter of the smaller end of said aperture in said inner connector member despite said embedding and espite compacting and extruding of said strands due to said compressive forces.

2. The apparatus of claim 1, wherein said highly malleable material has an elongation of more than 20% and a Brinell hardness number of less than 40.

3. The apparatus of claim 1, wherein said highly malleable material has an elongation of more than 30% and a Brinell hardness number of less than 25.

4. The apparatus of claim 1, comprising an additional connector member threadingly secured to said outer connector member for facilitating connection thereof to a source of a pulling force.

5. The apparatus of claim 1, in which the longitudinal aperture in said inner connector member is substantially cylindrical in form.

6. The apparatus of claim 1, wherein said highly malleable material is aluminum.

7. The apparatus of claim 6 wherein said aluminum is more than 80% pure and has an elongation of at least 20% and a Brinell hardness number of less than 40.

8. The apparatus of claim 7, wherein said aluminum is at least 95% pure, has an elongation of at least 30%, and has a Brinell hardness number of less than 25.

9. In an assembly of electrical conductor strands of aluminum or copper and a connector therefor, comprising
    an outer connector member having a longitudinal aperture extending therethrough providing a conical inner surface for at least a substantial portion of the length of said aperture;
    a longitudinally apertured inner connector member positioned within said outer connector member and having a continuous and uninterrupted conical outer surface extending longitudinally parallel to said conical inner surface of said outer connector member;
    conductor strands at least one of which extends into the longitudinal aperture in said inner connector member and at least another of which extends between said inner conical surface of said outer connector member and said outer conical surface of said inner connector member, said inner connector member being wedged into said outer connector member to grasp said strands;
    the improvement wherein said inner connector member is of a material highly malleable compared with said inner surface of said outer connector member and at least as malleable as the material of said cable, and said strands are embedded in said inner connector member in response to the pressure exerted by the wedging of said inner connector member into said outer connector member; said inner connector member being sufficiently hard to transmit compressive forces, due to said wedging, to said at least one conductor strand and thereby produce said embedding thereof; the outer diameter of said inner connector member being sufficient, over at least a portion of its length, to leave a substantial remanent thickness of said material between said at least one conductor strand and said at least another conductor strand upon application of said pulling; said remanent thickness being great enough that the maximum radial extent of said at least another conductor strand, measured from the longitudinal axis of said inner connector member, exceeds the radius of the smaller end of said aperture in said inner connector member despite said embedding and despite compacting and extruding of said one or more strands due to said compressive forces.

10. The apparatus of claim 9, wherein said highly malleable material has an elongation of more than 20% and a Brinell hardness number of less than 40.

11. The apparatus of claim 9, wherein said highly malleable material has an elongation of more than 30% and a Brinell hardness number of less than 25.

12. The apparatus of claim 9, comprising an additional connector member threadingly secured to said outer connector member for facilitating connection thereof to a source of a pulling force.

13. The apparatus of claim 9, in which said longitudinal aperture in said inner connector member is substantially cylindrical in form.

14. The apparatus of claim 9, wherein said highly malleable material is aluminum.

15. The apparatus of claim 14, wherein said aluminum is more than 80% pure and has an elongation of at least 20% and a Brinell hardness number of less than 40.

16. The apparatus of claim 15, wherein said aluminum is at least 95% pure, has an elongation of at least 30%, and has a Brinell hardness number of less than 25.

17. In the method of securing a connector to electrical conductor strands of aluminum or copper, comprising
  disposing at least one of said strands between a conical inner surface of a longitudinally-apertured outer connector member and a conical outer surface of a longitudinally-apertured inner connector member positioned within said outer connector member said inner surface and said outer surface being substantially parallel to each other and at least a portion of said inner connector member being substantially greater in diameter than the smaller end of said aperture in said outer connector member, and said conical outer surface being continuous and substantially uninterrupted,
  disposing at least another of said strands within the aperture in said inner connector member, and
  urging said inner connector member into said outer connector member to wedge at least one strand between said inner and outer connector members and to grasp said at least other strand within said inner connector member;
  the improvement comprising constituting said inner connector member of a material which is highly malleable compared with said inner surface of said other connector member and at least as malleable as the material of said strands, and urging said inner connector member into said outer connector member with sufficient force to embed said at least one strand and said at least other strand in said inner connector member, thereby to enhance the strength with which said strands are grasped by said connector; said inner connector member being sufficiently hard to transmit compressive forces, due to said wedging, to said at least another strand to produce said embedding; the outer diameter of said inner connector member being sufficient, over at least a portion of its length, to leave a remanent thickness of said material between said at least one strand and said at least another of said strands after said urging of said inner connector member into said outer connector member; said remanent thickness being great enough that the maximum radial extent of said at least one strand measured from the longitudinal axis of said inner connector member, exceeds the radius of the smaller end of said aperture in said inner connector member despite said embedding and despite compacting and flattening of said at least one strand due to said wedging.

18. The method of claim 17, wherein said highly malleable material has an elongation of more than 20% and a Brinell hardness number of less than 40.

19. The method of claim 17, wherein said highly malleable material has an elongation of more than 30% and a Brinell hardness number of less than 25.

20. The method of claim 17, wherein said highly malleable material is aluminum.

21. The method of claim 20, wherein said aluminum is more than 80% pure and has an elongation of at least 20% and a Brinell hardness number of less than 40.

22. The method of claim 21, wherein said aluminum is at least 95% pure, has an elongation of at least 30%, and has a Brinell hardness number of less than 25.

23. The method of claim 17, comprising also threadingly securing to said outer connector member an additional connector member adapted to be secured to a source of pulling force.

* * * * *